(12) United States Patent
Nguyen et al.

(10) Patent No.: US 7,734,184 B2
(45) Date of Patent: *Jun. 8, 2010

(54) OPTICAL TRANSCEIVER MODULE HAVING AN ACTIVE LINEAR OPTOELECTRONIC DEVICE

(75) Inventors: The-Linh Nguyen, San Jose, CA (US); D. James Douma, Monrovia, CA (US); Kishore Kamath, San Jose, CA (US); Andrew R. Williams, San Jose, CA (US)

(73) Assignee: Finisar Corporation, Sunnyvale, CA (US)

( * ) Notice: Subject to any disclaimer, the term of this patent is extended or adjusted under 35 U.S.C. 154(b) by 442 days.

This patent is subject to a terminal disclaimer.

(21) Appl. No.: 11/626,314

(22) Filed: Jan. 23, 2007

(65) Prior Publication Data

US 2008/0031629 A1 Feb. 7, 2008

Related U.S. Application Data (60) Provisional application No. 60/821,541, filed on Aug. 4, 2006.

(51) Int. Cl.
*H04B 10/00* (2006.01)
(52) U.S. Cl. .................. 398/135; 398/138; 398/139
(58) Field of Classification Search ................ 398/135, 398/138, 139, 128, 130, 140, 141
See application file for complete search history.

(56) References Cited

U.S. PATENT DOCUMENTS

| | | | |
|---|---|---|---|
| 3,548,338 A | 12/1970 | Shigeki et al. | |
| 4,633,525 A | 12/1986 | Eumurian | |
| 4,647,792 A | 3/1987 | Meslener et al. | |
| 4,647,800 A | 3/1987 | Meslner et al. | |
| 4,672,192 A | 6/1987 | Muka et al. | |
| 4,709,370 A | 11/1987 | Bednarz et al. | |
| 4,955,029 A | 9/1990 | Lecoy et al. | |
| 5,115,440 A | 5/1992 | Gysel et al. | |
| 5,119,392 A | 6/1992 | Childs | |
| 5,123,023 A | 6/1992 | Santarelli et al. | |

(Continued)

OTHER PUBLICATIONS

U.S. Appl. No. 11/626,320, Sep. 22, 2008, Restriction Requirement.

(Continued)

*Primary Examiner*—M. R. Sedighian
(74) *Attorney, Agent, or Firm*—Workman Nydegger (57) ABSTRACT

An optoelectronic transceiver comprises an active linear TOSA circuit mounted on a header. The active linear TOSA circuit includes input nodes for receiving a differential signal pair, a first bipolar transistor, a second bipolar transistor and an electro-optical transducer. A base terminal of the first bipolar transistor is coupled to the two input nodes and an emitter terminal of the first bipolar transistor is coupled to a base terminal of the second bipolar transistor. A collector terminal of the first bipolar transistor is coupled to a first terminal of the electro-optical transducer, the first terminal of the electro-optical transducer also being configured to be coupled to a voltage source. A collector terminal of the second bipolar transistor is coupled to a second terminal of the electro-optical transducer and an emitter terminal of the second bipolar transistor is coupled to a signal ground which is not the header ground.

22 Claims, 6 Drawing Sheets

U.S. PATENT DOCUMENTS

| | | | |
|---|---|---|---|
| 5,179,565 A | 1/1993 | Tsuchiya et al. | |
| 5,218,612 A | 6/1993 | Wandel | |
| 5,349,462 A | 9/1994 | Defranco et al. | |
| 5,442,648 A | 8/1995 | DuBose et al. | |
| 5,471,492 A | 11/1995 | Pidgeon et al. | |
| 5,521,933 A | 5/1996 | Sosa | |
| 5,734,668 A | 3/1998 | Raven et al. | |
| 5,894,490 A | 4/1999 | Plourde | |
| 5,909,294 A | 6/1999 | Doerr et al. | |
| 6,181,718 B1 | 1/2001 | Kobayashi et al. | |
| RE37,524 E | 1/2002 | Taguchi | |
| 6,364,541 B1 | 4/2002 | Nesnidal et al. | |
| 6,404,949 B1 | 6/2002 | Sargent et al. | |
| 6,529,536 B1 | 3/2003 | Taguchi | |
| 6,631,027 B2 | 10/2003 | Gerrish et al. | |
| 6,632,029 B1 | 10/2003 | Williamson et al. | |
| 6,891,868 B2 | 5/2005 | Verboom et al. | |
| 6,931,040 B2 | 8/2005 | Murata et al. | |
| 6,941,080 B2 | 9/2005 | Kasper et al. | |
| 7,054,344 B1 | 5/2006 | Nguyen et al. | |
| 7,133,429 B2 | 11/2006 | Moran | |
| 7,145,929 B2 | 12/2006 | Bergmann et al. | |
| 7,160,039 B2 | 1/2007 | Hargis et al. | |
| 7,174,106 B2 * | 2/2007 | Weber | 398/135 |
| 7,181,100 B2 * | 2/2007 | Douma | 385/14 |
| 7,184,452 B2 | 2/2007 | Moran | |
| 7,296,936 B2 * | 11/2007 | Crews | 385/88 |
| 7,322,754 B2 | 1/2008 | Wolf et al. | |
| 7,333,731 B2 * | 2/2008 | Taylor et al. | 398/138 |
| 7,411,987 B2 | 8/2008 | Murata et al. | |
| 7,468,998 B2 | 12/2008 | Luo et al. | |
| 7,539,423 B2 * | 5/2009 | Robinson et al. | 398/197 |
| 2001/0040720 A1 | 11/2001 | Gerrish et al. | |
| 2002/0181895 A1 * | 12/2002 | Gilliland et al. | 385/88 |
| 2003/0043869 A1 | 3/2003 | Vaughan | |
| 2003/0091304 A1 | 5/2003 | Tonai et al. | |
| 2003/0156608 A1 | 8/2003 | Ido et al. | |
| 2004/0066551 A1 | 4/2004 | Lelic et al. | |
| 2004/0258114 A1 | 12/2004 | Murata et al. | |
| 2005/0047455 A1 | 3/2005 | Tanaka | |
| 2005/0175299 A1 | 8/2005 | Hargis et al. | |
| 2005/0185882 A1 | 8/2005 | Zack et al. | |
| 2005/0195870 A1 | 9/2005 | Moran | |
| 2005/0232635 A1 * | 10/2005 | Aronson et al. | 398/135 |
| 2005/0243878 A1 | 11/2005 | Murata et al. | |
| 2005/0244111 A1 | 11/2005 | Wolf et al. | |
| 2005/0276607 A1 * | 12/2005 | Schunk | 398/135 |
| 2006/0114950 A1 | 6/2006 | Yen et al. | |
| 2006/0159462 A1 * | 7/2006 | Aronson et al. | 398/138 |
| 2006/0215716 A1 | 9/2006 | Luo et al. | |
| 2007/0171947 A1 | 7/2007 | Bell | |

OTHER PUBLICATIONS

U.S. Appl. No. 11/626,320, Jan. 9, 2009, Office Action.

* cited by examiner

OPTICAL TRANSCEIVER MODULE HAVING AN ACTIVE LINEAR OPTOELECTRONIC DEVICE

CROSS-REFERENCE TO RELATED APPLICATIONS

The present application claims the benefit of priority of U.S. Provisional Application Ser. No. 60/821,541, entitled LINEAR AMPLIFIER FOR USE WITH LASER DRIVER SIGNAL, filed on Aug. 4, 2006, and fully incorporated herein by reference in its entirety.

BACKGROUND OF THE INVENTION

1. The Field of the Invention

The present invention relates generally to optical transmitters. More specifically, the present invention relates to an optical transceiver module having an amplifier circuit for use in a transmitter optical subassembly ("TOSA") for linearly amplifying a differential input signal.

2. The Relevant Technology

Computing and networking technology have transformed our world. As the amount of information communicated over networks has increased, high speed transmission has become ever more critical. Many high speed data transmission networks rely on optical transceivers and similar devices for facilitating transmission and reception of digital data embodied in the form of optical signals over optical fibers. Optical networks are thus found in a wide variety of high speed applications ranging from as modest as a small Local Area Network (LAN) to as grandiose as the backbone of the Internet.

Typically, data transmission in such networks is implemented by way of an optical transmitter (also referred to as an electro-optical transducer), such as a laser or Light Emitting Diode (LED) mounted on a header within a transmitter optical subassembly ("TOSA"). The electro-optic transducer emits light when current is passed there through, the intensity of the emitted light being a function of the current magnitude through the transducer. Data reception is generally implemented by way of an optical receiver (referred to as an opto-electronic transducer), an example of which is a photodiode, which is generally housed within a receiver optical subassembly ("ROSA"). The optoelectronic transducer receives light and generates a current, the magnitude of the generated current being a function of the intensity of the received light. Both the TOSA and ROSA described above are typically included in an optical transceiver module to enable the transmission and reception of optical signals on behalf of a host device in which the transceiver is operably received.

Various other components are also employed by the optical transceiver ("transceiver") to aid in the control of the optical transmit and receive components, as well as the processing of various data and other signals. For example, such optical transceivers typically include an electro-optic transducer driver (e.g., referred to as a "laser driver" when used to drive a laser signal) configured to control the operation of the electro-optic transducer in response to various control inputs. The optical transceiver also generally includes an amplifier (e.g., often referred to as a "post-amplifier") configured to perform various operations with respect to certain parameters of a data signal received by the opto-electronic transducer.

Traditional optical transceivers employ the above-described TOSA that contains a laser in a housing, which housing is configured to couple the optical output of the laser to an optical fiber. The TOSA is attached to a printed circuit board assembly ("PCBA") included in the optical transceiver that contains circuitry, such as the laser driver to bias and modulate the laser. The circuitry on the PCBA is relatively distant from the TOSA and the laser it contains.

Having the laser driver or other drive circuit located a relatively significant distance away from the laser creates a problem in maintaining good signal integrity. This is especially true for higher bit rates. Specifically, the TOSA and laser driver circuitry are ideally impedance matched to avoid signal reflection and distortion along the transmit path. Generally speaking, this will result in excess power dissipation beyond the minimum required by the laser itself Another problem associated with relatively large distances between the laser drive circuitry and the laser is manifested in an increased emission of Electromagnetic Interference ("EMI") from the transceiver. The amount of EMI generated is proportional to both the drive current provided to the laser by the laser driver and the current loop formed there between.

Various solutions have been proposed or attempted for maintaining the signal fidelity from the laser driver to the laser and/or reducing the drive current and power consumption of a transceiver by incorporating an amplifier positioned near the laser within the TOSA.

Figure 1:
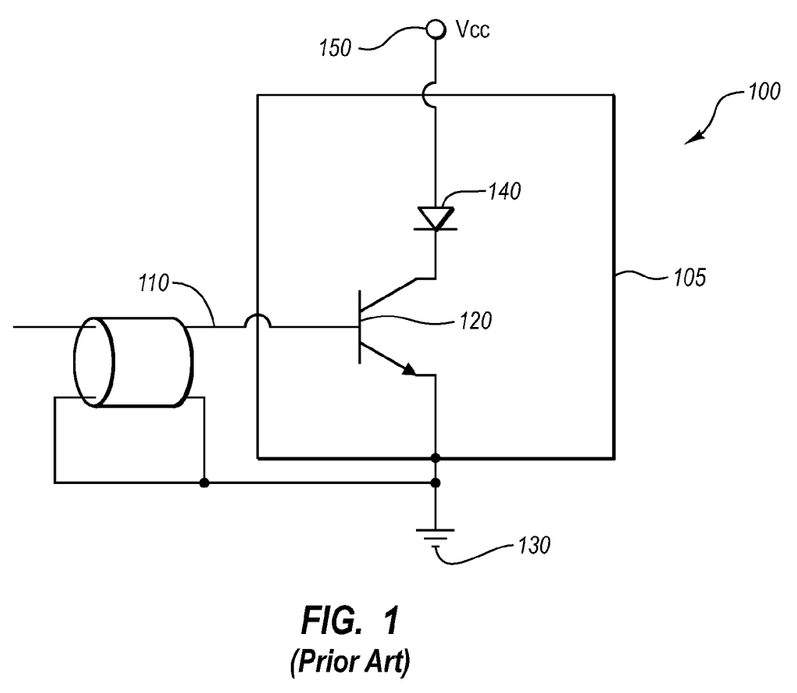
FIG. 1 illustrates a prior art amplifier circuit incorporated within a TOSA.

FIG. 1 illustrates an amplifier circuit 100 designed to reduce the power dissipated by a transceiver. The circuit 100 is mounted on and grounded to a header 105 and includes an input node for receiving a single-ended signal over a transmission line 110, the single-ended signal being provided to the base terminal of a bipolar transistor 120. A return ground 130 coupled to the emitter terminal of the transistor 120 draws current through the transistor and consequently draws current through an electro-optical transducer 140 coupled to a voltage source 150. The amount of current drawn through the electro-optical transducer 140 depends on the single-ended signal applied at the base terminal of the bipolar transistor 120 via the transmission line 110.

Notwithstanding its ability to reduce laser driver current and thereby reducing EMI and overall power consumption, the amplifier circuit 100 shown in FIG. 1 nevertheless suffers from a number of disadvantages. First, maintaining signal fidelity of a single-ended signal is difficult as it requires a high fidelity radio frequency ("RF") ground to provide a return path for the signal. This requires a very low inductance ground in the signal return path. Moreover, since the RF ground is connected to the header and the header is usually required to be connected to the chassis ground of the transceiver to help dissipate the heat, this can lead to a compliance problem in the system in which the transceiver's chassis is required to be separated from the signal ground. Second, the linear range of the amplifier 120 is limited. When the transistor 120 operates beyond its linear range, waveform shaping of the single-ended received signal is not preserved in the amplified output signal.

Figure 2:
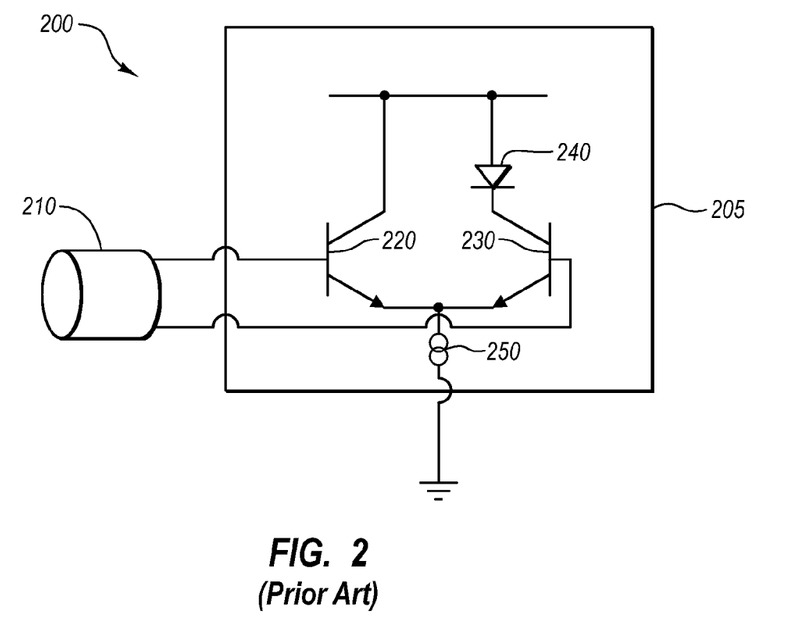
FIG. 2 depicts a prior art differential amplifier circuit incorporated within a TOSA.

FIG. 2 illustrates a differential amplifier and laser circuit 200 designed to maintain signal fidelity. The circuit 200 is mounted on a header 205 and includes two input nodes for receiving differential data signals over differential transmission line 210, a positive signal of the differential signal pair being provided to the base terminal of a first bipolar transistor 220 and a complementary signal being provided to the base terminal of a second bipolar transistor 230. The collector of the second transistor 230 is coupled to an electro-optical transducer 240, and the emitter terminals of both transistors 220 and 240 are coupled to a current source 250. The current source 250 draws current through either the bipolar transistor 220 or the bipolar transistor 230, or through both of the bipolar transistors 220 and 230 in a split manner. The amount of current drawn through the electro-optical transducer 240 depends on the differential data signals applied at the base terminal of the corresponding bipolar transistors 220 and 230.

Despite maintaining signal fidelity via its use of a differentially driven signal, the circuit 200 has numerous disadvantages. First, it dissipates a significant amount of power, half of the power being dissipated through the first transistor 220 without drawing current through the transducer 240. Second, the amplifier circuit 200 is not a linear amplifier, but rather digital. Thus, any waveform shaping performed on the differential signal prior to being provided to the circuit 200 is not preserved when the signal is amplified.

The subject matter claimed herein is not limited to embodiments that solve any disadvantages or that operate only in environments such as those described above. Rather, this background is only provided to illustrate one exemplary technology area where some embodiments described herein may be practiced.

BRIEF SUMMARY OF THE INVENTION

The present invention has been developed in response to the above and other needs in the art. Briefly summarized, embodiments of the present invention are directed to a transceiver module having an active linear TOSA circuit. The active linear TOSA circuit includes a single-ended amplifier capable of being driven by a differential signal so as to maintain signal fidelity while reducing power dissipation. In one embodiment, the circuit is mounted on a header and includes a first bipolar transistor for receiving, at its base terminal, a single-ended signal representative of a differential signal received by the TOSA circuit. The emitter terminal of the first bipolar transistor is coupled to the base terminal of a second bipolar transistor, the emitter terminal of the second bipolar transistor being coupled to a signal ground which is not the header ground. The collector terminal of the second bipolar transistor is coupled to a first terminal of an electro-optical transducer. The electro-optical transducer has a second terminal configured to be coupled to a voltage source, also being coupled to the collector terminal of the first bipolar transistor. This configuration linearly amplifies a received differential signal, maintaining signal fidelity, reducing power dissipation and EMI emission and preserving linearity.

These and other advantages and features of the present invention will become more fully apparent from the following description and appended claims, or may be learned by the practice of the invention as set forth hereinafter.

BRIEF DESCRIPTION OF THE DRAWINGS

To further clarify the above and other advantages and features of the present invention, a more particular description of the invention will be rendered by reference to specific embodiments thereof which are illustrated in the appended drawings. It is appreciated that these drawings depict only typical embodiments of the invention and are therefore not to be considered limiting of its scope. The invention will be described and explained with additional specificity and detail through the use of the accompanying drawings in which.

DETAILED DESCRIPTION OF THE PREFERRED EMBODIMENTS

Reference will now be made to the drawings to describe various aspects of exemplary embodiments of the invention. It should be understood that the drawings are diagrammatic and schematic representations of such exemplary embodiments and, accordingly, are not limiting of the scope of the present invention, nor are the drawings necessarily drawn to scale.

In general, embodiments of the invention are concerned with optoelectronic devices. More particularly, embodiments of the invention enable the use of differential signaling with a single ended amplifier in a transmitter optical subassembly (TOSA) of an optical transceiver module ("transceiver"). Advantageously, embodiments of the invention permit a distributed feedback ("DFB") laser included in the TOSA to be used in a low power consuming circuit to achieve long reach optical signaling.

The present invention can be implemented in various optoelectronic devices. As used herein, the term "optoelectronic device" includes devices having both optical and electrical components. Examples of optoelectronic devices include, but are not limited to, transponders, transceivers, transmitters, and/or receivers.

I. Example Operating Environment

Figure 3:
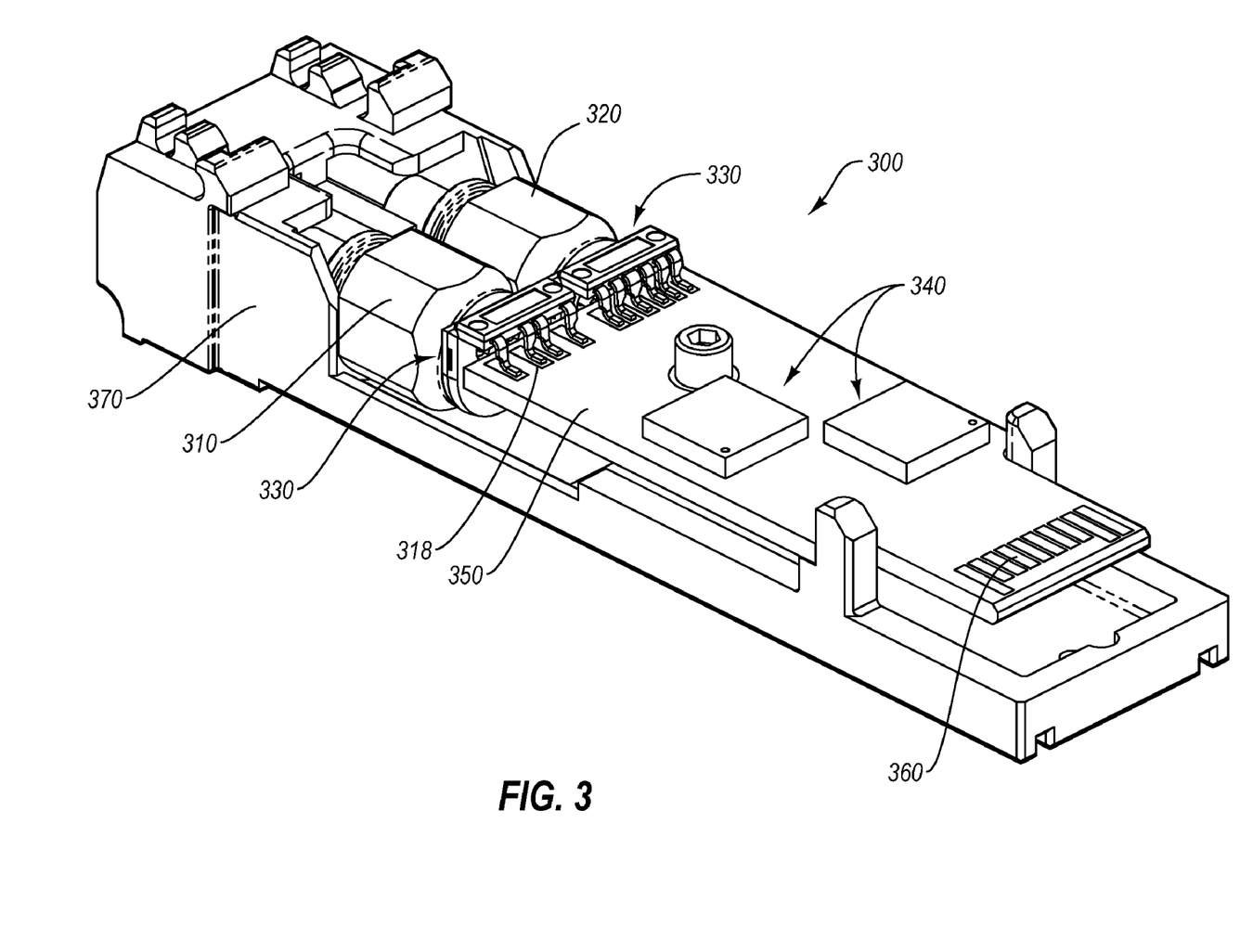
FIG. 3 is a perspective view of an example of an optical transceiver module including the present invention according to one embodiment.

Reference is first made to FIG. 3, which depicts a perspective view of an example optical transceiver module ("transceiver"), generally designated at 300, for use in transmitting and receiving optical signals in connection with an external host that is operatively connected, in one embodiment, to a communications network. As shown, the transceiver shown in FIG. 3 includes various components, including a Receiver Optical Subassembly ("ROSA") 310, a Transmitter Optical Subassembly ("TOSA") 320, electrical interfaces 330, various electronic components 340, such as a laser-driver/post-amplifier and control module for example, and a printed circuit board 350 which supports the electronic components 340.

In the illustrated embodiment, two electrical interfaces 330 are included in the transceiver 300, one each used to electrically connect the ROSA 310 and the TOSA 320 to a plurality of conductive pads located on the PCB 350. The electronic components 340 are also attached to the PCB 350. An edge connector 360 is located on an end of the PCB 350 to enable the transceiver 300 to electrically and mechanically interface with a host (not shown). In addition, the above-mentioned components of the transceiver 300 are partially housed within a housing 370. Though not shown, some embodiments include a shell that cooperates with the housing 370 to define an enclosure for components of the transceiver 300.

Figure 4:
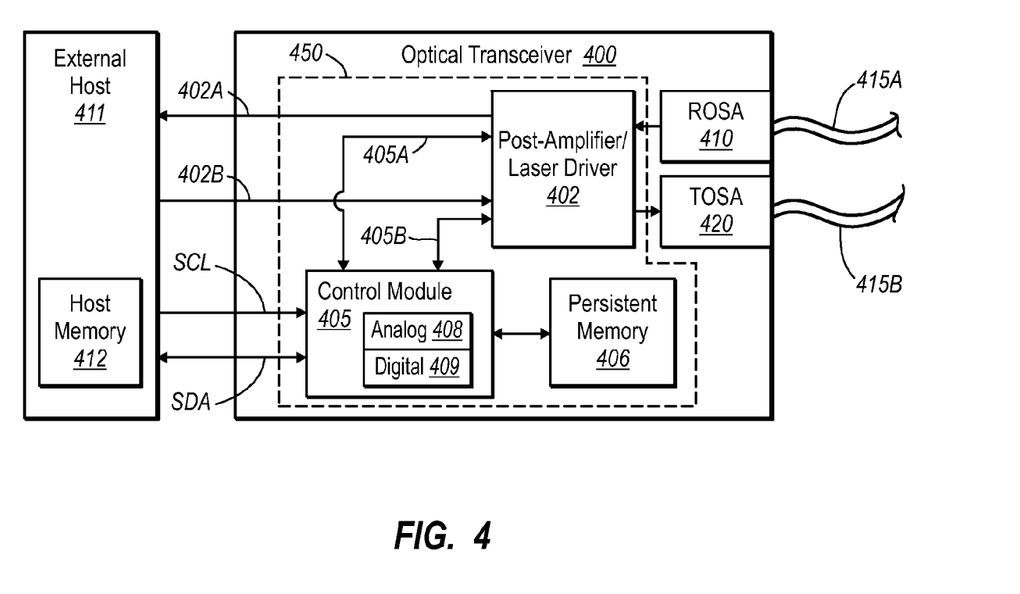
FIG. 4 is a simplified block view showing various aspects of the optical transceiver module of FIG. 3.

Reference is now made to FIG. 4, which is a simplified block diagram of an example of the optical transceiver denoted at 300 in FIG. 3, depicting various physical and operational aspects of the transceiver. While the optical transceiver 400 will be described in some detail, the optical transceiver 400 is described by way of illustration only, and not by way of restricting the scope of the invention. As mentioned above, the optical transceiver 400 in one embodiment is suitable for optical signal transmission and reception at a variety of per-second data rates, including 1 Gbit/s, 2 Gbit/s, 4 Gbit/s, 10 Gbit/s, as well as even higher data rates. Furthermore, the embodiments described herein can be implemented in optical transceivers conforming with any of a variety of different form factors, examples of which include, but are not limited to, XFP, SFP, SFP+ and SFF, as well as a variety of different communication protocols, examples of which include, but are not limited to, GiGE, SONET, and Fibre Channel.

With continuing reference to FIG. 4, transceiver 400 includes a printed circuit board ("PCB") 450 on which the various electronic components of the transceiver are mounted. One such component is a control module 405. Control module 405 is connected to an integrated laser driver/post-amplifier ("LDPA") 402 by connections 405A and 405B. These connections allow control module 405 to monitor the operation of the LDPA 402 as will be described in more detail to follow. Control module 405 is connected to a persistent memory 406, which stores microcode for configuring control module 405 and is also used to store operational parameters. The control module 405 is also able to communicate with an external host 411 as depicted by the Serial Data line (SDA) and Serial Clock line (SCL).

Transceiver 400 includes both a transmit path and a receive path, both of which will now be described. The receive path includes ROSA 410, which transforms an incoming optical data signal into an electrical data signal. The electrical data signal is then provided to a post-amplifier portion of LDPA 402. The post-amplifier amplifies and otherwise processes the electrical data signal and provides the electrical data signal to the external host 411 via connection 402A.

For the transmit path, external host 411 generates an electrical data signal and provides the electrical data signal to a laser driver portion of LDPA 402 via connection 402B. The laser driver processes the electrical data signal and drives the TOSA 420, which causes the TOSA 420 to emit an optical data signal.

The operation of transceiver 400 will now be described in further detail. In operation, the optical transceiver 400 receives an optical data signal from a fiber 415A via the ROSA 410 in a manner to be described more fully below. The ROSA 410 transforms the received optical data signal into an electrical data signal. The ROSA 410 then provides the resulting electrical data signal to a post-amplifier. In the illustrated embodiment, the post amplifier is consolidated with the laser driver as an integrated LDPA 402. As such, the LDPA 402 resides on a single integrated circuit chip and is included as a component, together with the other electronic components 340, some of which are further described below, on PCB 450. In other embodiments, the post amplifier and laser driver are implemented as separate components on the PCB 450.

The post-amplifier portion of the LDPA 402 amplifies the received electrical data signal and provides the amplified data signal to external host 411 over signal path 402A. The external host 411 may be any computing system capable of communicating with the optical transceiver 400. The external host 411 contains a host memory 412 that may be any volatile or non-volatile memory source. In one embodiment, some components of the optical transceiver 400 can reside on the host 411 while the other components of the transceiver reside on the PCB 450 separate from the host 411.

The optical transceiver 400 may also receive electrical data signals from the host 411 for transmission onto a fiber 415B. Specifically, the laser driver portion of the LDPA 402 receives the electrical data signal from the host 411 via the signal path 402B, and drives a light source within the TOSA 420. One example of a light source is a DFB laser that causes the TOSA 420 to emit onto the fiber 415B optical data signals representative of the information in the electrical data signal provided by the host 411. Typically, the light source is mounted on a header within the TOSA, the header including a plurality of vias through which leads are employed to enable passage of electrical signals from the electrical interface of the PCB 450 to the light source and other components mounted on the header.

The behavior of the ROSA 410, the LDPA 402, and the TOSA 420 may vary dynamically due to a number of factors. For example, temperature changes, power fluctuations, and feedback conditions may each affect the performance of these components. Accordingly, the transceiver 400 includes a control module 405, which may evaluate environmental conditions, such as temperature, age of the laser, and/or operating conditions, such as voltage, and receive information from the post-amplifier portion of the LDPA 402 by way of connection 405A, and from the laser driver portion of the LDPA by way of connection 405B. This arrangement allows the control module 405 to optimize the performance of the laser and other components to compensate for dynamically varying conditions.

Specifically, the control module 405 optimizes the operation of the transceiver 400 by adjusting settings on the LDPA 402 as represented by the connections 405A and 405B. These settings adjustments can be intermittent and are generally only made when temperature or voltage or other low frequency changes so warrant.

The control module 405 has access to a persistent memory 406, which in one embodiment, is an Electrically Erasable and Programmable Read Only Memory (EEPROM). Persistent memory 406 may also be any other non-volatile memory source. Persistent memory 406 is used to store microcode for configuring control module 405 and for storing operational parameters that have been measured by the control module 405. The persistent memory 406 and the control module 405 may be packaged together in the same package or in different packages without restriction.

Data and clock signals may be provided from the host 411 to the control module 405 using the SDA and SCL lines respectively. Also data may be provided from the control module 405 to the host 411 to allow for transmitting diagnostic data such as environmental and/or operational parameters. The control module 405 includes both an analog portion 408 and a digital portion 409. In this example, the analog portion 408 and the digital portion 409 collectively enable the control module to implement logic digitally, while still largely interfacing with the rest of the optical transceiver 400 using analog signals.

II. Example Embodiment of an Active Linear TOSA

Figure 5:
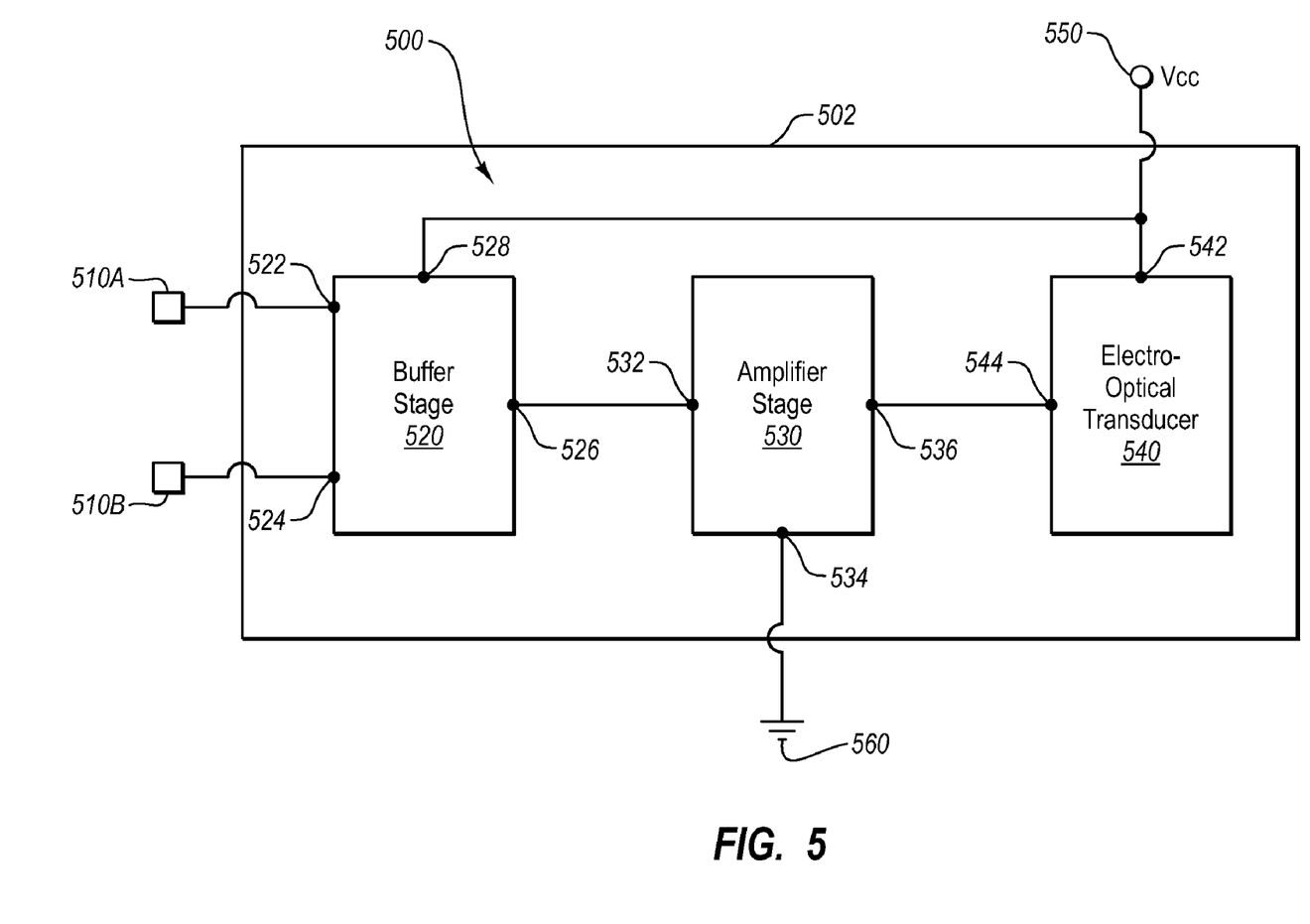
FIG. 5 is a block diagram of an active linear TOSA circuit, according to one embodiment.

Referring now to FIG. 5, a block diagram of an example active linear TOSA circuit 500 is shown. The active linear TOSA circuit 500 may be mounted on a header 502 of a TOSA such as the TOSAs 320 and 420 of FIGS. 3 and 4, although this is not required. Note that the following description is for illustration only and should not be used to limit the scope of the appended claims or the embodiments disclosed herein.

The circuit 500 includes differential inputs 510A and 510B. The differential inputs each receive a differential signal over a differential transmission line from a driver output stage such as the laser driver portion of the LDPA 402 of FIG. 4. Specifically, input node 510A receives the positive signal portion and input node 510B receives a complementary signal portion. As mentioned above, the differential signal received at nodes 510A and 510B may be 1 Gbit/s, 2 Gbit/s, 4 Gbit/s, 10 Gbit/s, as well as even higher data rates.

The circuit 500 further includes a buffer stage 520, an amplifier stage 530 and an electro-optical transducer 540. The buffer stage 520 has two nodes 522 and 524 for receiving the differential signals, the first node 522 being coupled to the differential input 510A and the second node 524 being coupled to the differential input 510B. Note that, as used herein, "coupled to" is defined to mean both a direct connection between two or more circuit objects without any intervening circuit objects and an indirect connection between two or more circuit objects with one or more intervening circuit objects. For example, two circuit objects directly connected to each other are "coupled to" one another. The same two circuit objects would also be "coupled to" each other if there were one or more intervening circuit objects connected between them.

The buffer stage 520 includes a third node 526 and a fourth node 528, the third node 526 being coupled to a first node 532 of the amplifier stage and the fourth node 528 being electrically coupled to a first node 542 of the transducer 540. The buffer stage 520 receives the differential signal and converts it to a single-ended signal which it provides to the amplifier stage 530. Additionally, the buffer stage 520 isolates the amplifier stage from the differential input 510A and 510B so that capacitance of the amplifier stage does not affect the differential signal received at the differential input since the impedance at node 526 can be made to be much smaller than the impedance at nodes 522 and 524. Specifically the impedance at nodes 522 and 524 is usually 50 ohms each and the impedance at node 526 can be made as low as less than 5 ohms. The low impedance in the presence of capacitance of the output stage 530 allows high bandwidth operation dictated by the R-C time constant as one trained in the art would appreciate.

The amplifier stage 530 includes a second node 534 coupled to a signal ground 560. As will be described more fully below, the signal ground 560 is not grounded to the TOSA header 502 upon which the circuit 500 is mounted. The amplifier stage additionally has a third node 536 coupled to a second node 544 of the transducer 540.

The first node 542 of the transducer 540, in addition to being electrically coupled to the fourth node 528 of the buffer stage, is also configured to be electrically coupled to a voltage source 550.

Figure 6:
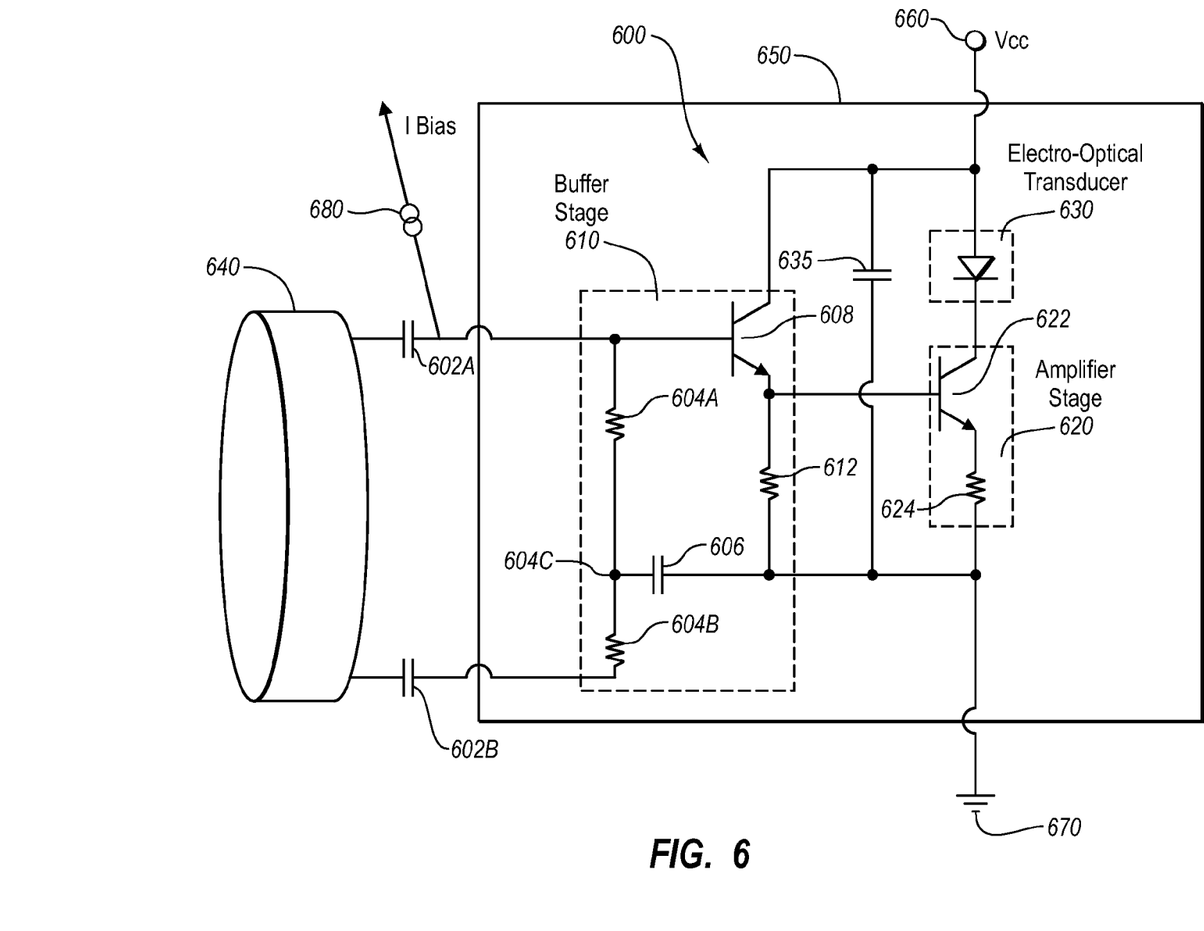
FIG. 6 is a schematic diagram of the active linear TOSA circuit of FIG. 5.

Turning now to FIG. 6, a specific embodiment 600 of the example active linear TOSA circuit 500 of FIG. 5 is schematically illustrated. The circuit 600 includes a buffer stage 610, an amplifier stage 620 and an electro-optical transducer 630, each configured in accordance with the corresponding descriptions given above in connection with FIG. 5. A signal is received by first input node 602A and second input node 602B from a driver output stage 640. In one embodiment, both input nodes 602A and 602B may comprise AC-coupling capacitors, although this is not required in all embodiments. In the illustrated embodiment, the driver output stage 640 is illustrated as a Current Mode Logic (CML) output stage. The CML output stage is a differential output stage with two complementary output nodes, thus allowing the output stage 640 to take advantage of the speed and signal fidelity advantages of a differential output. It is noted that output stage 640 may include associated interconnecting transmission line with characteristic impedance matched to the CML stage output impedance and the buffer stage 610's input impedance. This will be discussed further in the following section. The first input node 602A may be coupled to a bias current source 680.

The first input node 602A and second input node 602B permit the differential signal to enter the confines of a header 650 upon which the circuit 600 is mounted. Although not shown, the header 650 is typically grounded to the chassis of a device in which the header is implemented. For instance, a TOSA having a header 650 may be implemented in an optoelectronic transceiver. In such a case, the header 650 would typically be grounded to the chassis of the transceiver.

The differential signal is terminated within the buffer stage 610 by a traditional differential signal termination sub-stage comprising two termination resistors 604A and 604B and a termination capacitor 606. Typically, the impedance of the termination resistors is chosen to match the impedance of a differential transmission line carrying the differential signal from the driver output stage 640 to the input nodes 602A and 602B. For instance, if the differential transmission line has an impedance of 100 Ohms, each resistor would have an impedance of 50 Ohm.

As a result of the configuration of the termination sub-stage and the differential signal from the output stage 640, a virtual (AC) ground is created at node 604C. This node is then coupled to the signal ground return node 670. Thus a single-ended signal component of the differential signal is provided to the base terminal of the first bipolar transistor 608. And since the return path of the output signal of the amplifier is virtually at the same potential as the virtual ground node 604C, the single-ended signal component is transferred to the output signal. Additionally, the buffer stage 610 includes a first resistor 612 coupled to the emitter terminal of the first transistor 608, the first resistor being used to bias the first transistor.

As previously described, the buffer stage 610 is coupled to the amplifier stage 620. In the present embodiment, this is accomplished by coupling the emitter terminal of the first transistor 608 to the base terminal of a second bipolar transistor 622 within the amplifier stage. The emitter terminal of the second transistor 622 is coupled to a signal ground 670 which does not need to be an RF ground. This is achieved by providing carefully designed decoupling circuits from supply node 660 to signal ground node 670. An example of such decoupling circuits is shown here as a decoupling capacitor 635. A first terminal of the decoupling capacitor 635 is coupled to the collector terminal of the first bipolar transistor 608 and to a first terminal of the electro-optical transducer. A second terminal of the decoupling capacitor 635 is coupled to the signal ground 670. Though not shown here in this specific example, a person knowledgeable in the art of electronics can envision that realistically a more complicated decoupling network is required to address different ranges of frequencies of interest. This may mean that some of the decoupling circuits may reside on the driver IC and some may reside external to the driver IC. It is also conceivable that in addition to capacitors the decoupling circuit may also consist of resistors as well as inductors which is not shown here. Accordingly, the signal ground is external to the header 650 and consequently the signal ground is not connected to chassis ground when the circuit 600 is used in an optical transceiver. This provides numerous advantages in operation which will be discussed in greater detail below. The amplifier stage 620 also includes a second resistor 624 that couples the emitter terminal of the second transistor 622 to signal ground node 670 which linearizes the circuit 600.

The buffer stage 610 and the amplifier stage 620 are both coupled to the electro-optical transducer 630. In particular, the first terminal of the transducer 630 is coupled to the collector terminal of the first bipolar transistor 608, the first terminal also being configured to be coupled to a voltage source 660. The voltage source 660 provides current to the circuit 600. A second terminal of the transducer 630 is coupled to the collector terminal of the second bipolar transistor 622.

In operation, a differential signal is received from the driver output stage 640 by the buffer stage 610. The buffer stage 610 converts the differential signal to a single-ended signal and provides it to the amplifier stage 620, sending it from the emitter terminal of the first transistor 608 to the base terminal of the second transistor 622. The second transistor pulls current through the electro-optical transducer 630, the magnitude of the current pulled through the transducer directly proportional to the current received from the first transistor 608. Accordingly, the single-ended signal received from the first transistor 608 is amplified by the second transistor 622 and the transducer 630 emits an optical signal representative of the amplified signal. The electrical signals are returned to signal ground 670, the signal ground 670 being separate from the header or chassis ground.

It should be noted that the specific example described above utilizes bipolar transistors. But the function can be implemented with field-effect transistors (FET's) without altering the theory, spirit and advantages of the invention.

Various advantages result from the use of an active linear TOSA circuit. First, the signal ground is separate from the header/chassis ground. When a single-ended drive system is implemented as illustrated in FIG. 1 and the return ground signal is grounded to a header or chassis ground within an optical transceiver or other application, this can cause system problems. For instance, a system having numerous optical transceivers might share a common system ground to which the chassis ground of each transceiver is coupled. The return current for the single-ended drive system of each transceiver returns through the common ground, which can cause crosstalk between the signals. Other system problems can also result from returning a single-ended signal through the chassis ground. Another problem could arise when the chassis is subjected to an ESD stimulus. If the signal ground is connected to the chassis ground then the module in operation can take errors in the data. In many systems this is unacceptable. Accordingly, many applications require that the signal ground be separate from the header/chassis ground. One such application in which the present invention would be useful is the Enhanced 8.5 and 10 Gigabit Small Form Factor Pluggable Module (SFP+), requiring that the signal ground be separate from the header ground. See specification SFF-8431, available at ftp://ftp.seagate.com/sff/SFF-8431.PDF.

Second, there is no need for a good RF ground for the circuit 600. Typically when a single-ended signal is provided from a driver to an amplifier circuit on a header, such as in FIG. 1, a good RF ground is required due to noise that can affect the signal as it travels over the transmission line. The RF ground must have high fidelity because it provides the return path for the signal. Advantageously, the signal provided from a driver to the circuit 600 is a differential signal and does not require a good RF ground.

Third, the circuit 600 linearly amplifies the differential signal received from the driver. Current laser drivers include many features for shaping the differential signal prior to providing it to a TOSA to offset inherent laser imperfections and to produce an optimum module output. Using the circuit 600, the shaped input signal to the TOSA is only linearly amplified while the signal shape in time is maintained. In contrast, a differential amplifier TOSA circuit such as depicted in FIG. 2 normalizes the wave shape at its output to either a low level or a high level and in the process destroys the signal shape. Thus, any waveform shaping done on a signal prior to providing it to a TOSA, such as amplitude boosting or jitter compensation, is preserved when the signal is linearly amplified in an active linear TOSA circuit, but is lost when differentially amplified.

Fourth, the magnitude of the differential signal received from a laser driver can be relatively small when using the circuit 600 in comparison to the magnitude of the differential signal needed for the differential amplifier circuit of FIG. 2 because of the amount of amplification achieved with the circuit 600. The voltage required to drive a differential signal depends both on the magnitude of the signal and the impedance of the transmission lines used to carry the signal. The voltage can be reduced by reducing either the signal magnitude or the transmission line impedance. In the case of the differential amplifier circuit of FIG. 2, the impedance of the transmission lines must be reduced so as not to exceed voltage headroom. However, manufacturing transmission lines with low impedance is more difficult than manufacturing transmission lines with high impedance. Advantageously, relatively high impedance transmission lines may be used in conjunction with the circuit 600 because the differential signal can be relatively small.

Figure 7A:
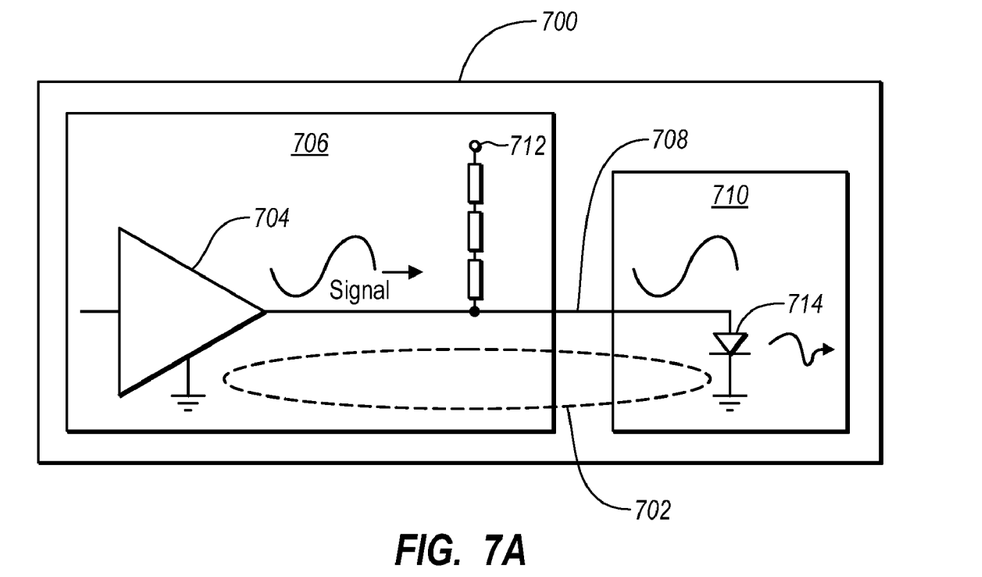
FIG. 7A illustrates an EMI current loop generated in an optical transceiver with a traditional TOSA.
Figure 7B:
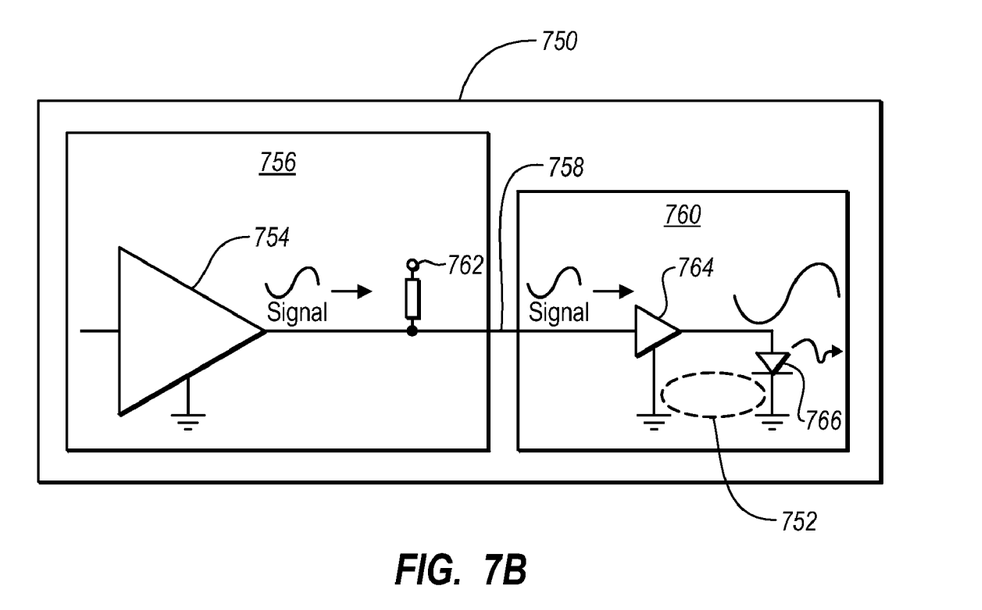
FIG. 7B illustrates an EMI current loop generated in an optical transceiver with an active linear TOSA configured in accordance with one embodiment of the present invention.

Fifth, the electromagnetic interference ("EMI") emitted by an optical transceiver module with an active linear TOSA (e.g., a TOSA having an active linear TOSA circuit) is much less than the EMI emitted by an optical transceiver with a traditional TOSA. This results because the EMI current loop within an optical transceiver with an active linear TOSA is much smaller than the EMI current loop within an optical transceiver with a traditional TOSA, as illustrated in FIGS. 7A and 7B. Of course, EMI is proportional to the drive current and the current loop.

FIG. 7A depicts an EMI current loop 702 in an optical transceiver 700 with a traditional TOSA 710. A laser driver 704 is disposed on a PCBA 706 and provides a signal over transmission line 708 to the TOSA 710. A bias current 712 is provided in order to drive an electro-optical transducer 714 within the TOSA. The TOSA 710 either lacks an amplifier or has an amplifier providing less amplification than an active linear TOSA circuit.

FIG. 7B depicts an EMI current loop 752 in an optical transceiver 750 with an active linear TOSA 760. The transceiver 750 has a laser driver 754 disposed on a PCBA 756 providing a signal over a transmission line 758 to the TOSA 760. The signal provided by the driver 754 is amplified by an active linear TOSA circuit 764 configured in accordance with the circuit 600 of FIG. 6 and is provided to an electro-optical transducer 766. A bias current 762 is also provided in order to bias the circuit 764 and electro-optical transducer 764 within the TOSA.

Because the TOSA 760 includes the active linear TOSA circuit 764, the magnitude of the bias current 762 needed to bias the circuit 764 and transducer 766 is relatively small when compared to the bias current 712 needed to bias the transducer 714 in the traditional TOSA 710. Consequently, the magnitude of the signal provided over the transmission line 758 to the active linear TOSA is small compared to the magnitude of the signal provided over the transmission line 708 to the traditional TOSA and any EMI emitted by the transmission line 758 may be considered negligible.

Within the optical transceiver 700 implementing the traditional TOSA 710, the EMI current loop 702 carrying a strong signal is defined by the signal path from the driver 704 to the transducer 714 and back through ground. In contrast, within the optical transceiver 750 implementing the active linear TOSA 760, the EMI current loop 752 carrying a signal of comparable magnitude is defined by the signal path from the amplifier 764 to the transducer 768 and back through ground. While not drawn to scale, the size of an EMI current loop 752 within an active linear TOSA will typically be much smaller than the size of an EMI current loop 702 within a transceiver having a traditional TOSA because in the active linear TOSA, the electro-optical transducer is positioned proximate to the amplifier. This results in the emission of less EMI from a transceiver with an active linear TOSA relative to a transceiver having a traditional TOSA.

The discussion of FIGS. 7A through 7B highlights other advantages of an active linear TOSA circuit. For instance, the relatively small signal used to drive the active linear TOSA still originates from a driver that must be impedance matched to the TOSA for good signal integrity. However, because the drive signal is relatively small, the power required to do this is insignificant. Additionally, the laser is connected directly to the amplifier output so it can be driven with the minimum drive current without the need for impedance matching. Indeed, the power dissipation of an optical transceiver with an active linear TOSA is approximately two to four times less than the power dissipation of transceivers implementing the TOSAs of FIGS. 1 and 2. For instance, the transceiver 750 of FIG. 7B can dissipate one Watt or less when compared to the transceiver 700 of FIG. 7A having the traditional TOSA, all other components being approximately equal.

A further benefit of the active linear TOSA is that the electro-optical transducer within the TOSA is biased by the amplifier circuit and all the bias components associated with this are contained within the TOSA. This simplifies the module PCBA by eliminating the need for having laser biasing components on the PCBA. An optical transceiver using a traditional TOSA biases the transducer using many external components on the PCBA. These bias networks are generally complex and difficult to design because the high speed signal transmitted between the laser driver and the laser is very sensitive to their loading effects. The amplifier circuit of the active linear TOSA does require a bias current but it is very small compared to a traditional TOSA bias current and it can be provided easily without negatively impacting the high speed signal.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. An optoelectronic transceiver for use in optical communication networks, comprising:
   a printed circuit board;
   a receiver optical subassembly; and
   an active linear transmitter optical subassembly, including
      a header grounded to a chassis ground upon which circuitry is mounted, the circuitry including:
      a first input node configured to receive a first data signal;
      a second input node configured to receive a second data signal that is complementary of the first data signal;
      a buffer stage having a first node coupled to the first input node and a second node coupled to the second input node;
      an amplifier stage having a fifth node coupled to a third node of the buffer stage, having a sixth node coupled to a signal ground, wherein the signal ground is not coupled to the header; and
      an electro-optical transducer having an eighth node coupled to a seventh node of the amplifier stage and having a ninth node configured to be coupled to a voltage source, the electro-optical transducer being coupled to a fourth node of the buffer stage.

2. The transceiver of claim 1, further comprising a laser driver operably connected to the first and second input nodes, wherein the laser driver includes features for shaping the first and second data signals to produce an optimum transceiver output.

3. The transceiver of claim 2, wherein the active linear transmitter optical subassembly preserves the shaping of the first and second data signals by linearly amplifying the first and second data signals.

4. The transceiver of claim 1, further comprising a laser driver and a post amplifier, wherein the laser driver and the post amplifier are integrated within a single integrated circuit on the printed circuit board.

5. The transceiver of claim 4, further comprising a controller included on the printed circuit board that governs operation of the integrated laser driver and post amplifier.

6. The transceiver of claim 1, wherein the first and second input nodes include AC coupling capacitors.

7. The transceiver of claim 1, wherein:
   the buffer stage includes two termination resistors, a capacitor and a first bipolar transistor;
   the third node of the buffer stage includes an emitter terminal of the first bipolar transistor; and
   the fourth node of the buffer stage includes a collector terminal of the first bipolar transistor.

8. The transceiver of claim 1, wherein:
   the amplifier stage includes a second bipolar transistor;
   the fifth node of the amplifier stage includes a base terminal of the second bipolar transistor;
   the sixth node of the amplifier stage includes an emitter terminal of the second bipolar transistor; and
   the seventh node of the amplifier stage includes a collector terminal of the second bipolar transistor.

9. The transceiver of claim 1, wherein, the signal ground is not a radio frequency ("RF") ground.

10. The transceiver of claim 1, wherein the transceiver has a total power dissipation of no more than one Watt.

11. An optoelectronic transceiver, comprising:
   a control module;
   a persistent memory operably connected to the control module; and
   an active linear transmitter optical subassembly, including
      a header upon which circuitry is mounted, the circuitry including:
      a first input node configured to receive a first data signal;
      a second input node configured to receive a second data signal that is complementary of the first data signal;
      a first bipolar transistor having a base terminal coupled to the first and second input nodes;
      a second bipolar transistor having a base terminal coupled to an emitter terminal of the first bipolar transistor and having an emitter terminal coupled to a signal ground, wherein the signal ground is not coupled to the header;

an electro-optical transducer having a first terminal configured to be coupled to a voltage source and being coupled to a collector terminal of the first bipolar transistor, the electro-optical transducer having a second terminal coupled to a collector terminal of the second bipolar transistor; and a decoupling circuit coupled between the voltage source and the signal ground.

12. The transceiver of claim 11, further comprising a receiver optical subassembly that includes an opto-electrical transducer.

13. The transceiver of claim 12, further comprising a post amplifier operably connected to the receiver optical subassembly.

14. The transceiver of claim 13, further comprising a differential transmission line for carrying the first and second data signals from the laser driver to the active linear transmitter optical subassembly.

15. The transceiver of claim 11, wherein the active linear transmitter optical subassembly further comprises:
   a first termination resistor having a first terminal coupled to the first input node and being coupled to the base terminal of the first bipolar transistor;
   a second termination resistor having a first terminal coupled to the second input node and a second terminal coupled to a second terminal of the first termination resistor;
   a termination capacitor, wherein a first terminal of the termination capacitor is coupled to the second terminal of the first termination resistor and to the second terminal of the second termination resistor;
   a third resistor having a first terminal coupled to the emitter terminal of the first bipolar transistor and being coupled to the base terminal of the second bipolar transistor and having a second terminal coupled to a second terminal of the termination capacitor and being coupled to the emitter terminal of the second bipolar transistor and being coupled to the signal ground.

16. The transceiver of claim 11, wherein emission of electromagnetic interference from the transceiver is controlled by the active linear transmitter optical subassembly.

17. The transceiver of claim 11, wherein the active linear transmitter optical subassembly controls the size of an electromagnetic interference current loop defined in the transceiver.

18. The transceiver of claim 11, wherein the electro-optical transducer is a distributed feedback laser.

19. The transceiver of claim 11, wherein the decoupling circuit coupled between the voltage source and the signal ground includes a decoupling capacitor, wherein:
   a first terminal of the decoupling capacitor is coupled to the collector terminal of the first bipolar transistor and to the first terminal of the electro-optical transducer; and
   a second terminal of the decoupling capacitor is coupled to the signal ground.

20. In optoelectronic device, comprising:
   a printed circuit board having a laser driver and a post amplifier disposed thereon;
   a receiver optical subassembly operably coupled to the post amplifier; and
   an active linear transmitter optical subassembly operably coupled to the laser driver, the transmitter optical subassembly including a header assembly electrically coupled to a chassis ground, the header supporting circuitry, the circuitry including:
      a first input node configured to receive a first data signal;
      a second input node configured to receive a second data signal that is complementary of the first data signal;
      a buffer stage having a first node coupled to the first input node and a second node coupled to the second input node, the buffer stage being configured to receive the first and second data signals from the first and second input nodes and convert the first and second data signals to a single-ended signal;
      an amplifier stage having a first node coupled to a third node of the buffer stage and having a second node coupled to a signal ground, wherein the signal ground is not coupled to the chassis ground, the amplifier stage being configured to receive the single-ended signal from the buffer stage and linearly amplify the single-ended signal to produce an amplified single-ended signal; and
      an electro-optical transducer having a first node coupled to a third node of the amplifier stage and having a second node coupled to a voltage source, the second node of the electro-optical transducer also being coupled to a fourth node of the buffer stage, wherein the electro-optical transducer is driven by the amplified single-ended signal to emit an optical signal representative of the amplified single-ended signal.

21. The optoelectronic package of claim 20, wherein:
   the buffer stage comprises a first termination resistor, a second termination resistor, a termination capacitor, a third resistor and a first bipolar transistor;
   the amplifier stage comprises a second bipolar transistor and a second resistor; and
   the electro-optical transducer comprises a distributed feedback laser.

22. The optoelectronic package of claim 20, wherein the first and second data signals have been shaped to offset inherent imperfections in the electro-optical transducer prior to being received at the first and second input nodes.

* * * * *